(12) United States Patent
Hashi

(10) Patent No.: US 6,570,618 B1
(45) Date of Patent: May 27, 2003

(54) SOLID-STATE IMAGE SENSING APPARATUS, METHOD FOR DRIVING THE SAME AND CAMERA

(75) Inventor: Mayuki Hashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/190,462

(22) Filed: Nov. 13, 1998

(30) Foreign Application Priority Data

Nov. 14, 1997 (JP) .............................................. 9-313014

(51) Int. Cl.⁷ .......................... H04N 3/14; H04N 5/335
(52) U.S. Cl. ...................... 348/314; 348/299; 257/239
(58) Field of Search ................................ 348/314, 297, 348/299; 257/239

(56) References Cited

U.S. PATENT DOCUMENTS

| | | | | |
|---|---|---|---|---|
| 4,626,915 A | * | 12/1986 | Takatsu | 257/291 |
| 4,993,053 A | * | 2/1991 | Itoh et al. | 257/239 |
| 5,572,256 A | * | 11/1996 | Egawa et al. | 348/296 |
| 5,631,705 A | * | 5/1997 | Tani | 348/228.1 |
| 6,018,365 A | * | 1/2000 | Merrill | 348/297 |
| 6,157,053 A | * | 12/2000 | Tanabe | 257/236 |
| 6,211,915 B1 | * | 4/2001 | Harada | 348/298 |
| 6,310,369 B1 | * | 10/2001 | Narabu et al. | 257/239 |

\* cited by examiner

*Primary Examiner*—Andrew Christensen
*Assistant Examiner*—Eric Wisdahl
(74) *Attorney, Agent, or Firm*—Sonnenschein, Nath & Rosenthal

(57) ABSTRACT

When the reset gate electrode of the charge detecting section is driven with the reset pulse of three levels, it is difficult to realize the timing control when high speed operation is required. In the charge detecting section of the CCD solid-state image sensing apparatus having wide dynamic range, two reset gate electrodes, for example, are arranged in vertical between the FD area and RD area, and different reset pulses φRG1, φRG2 are applied to these reset gate electrodes to realize the reset operation, clipping operation and adding operation through the driving by the 2-level pulse.

7 Claims, 7 Drawing Sheets

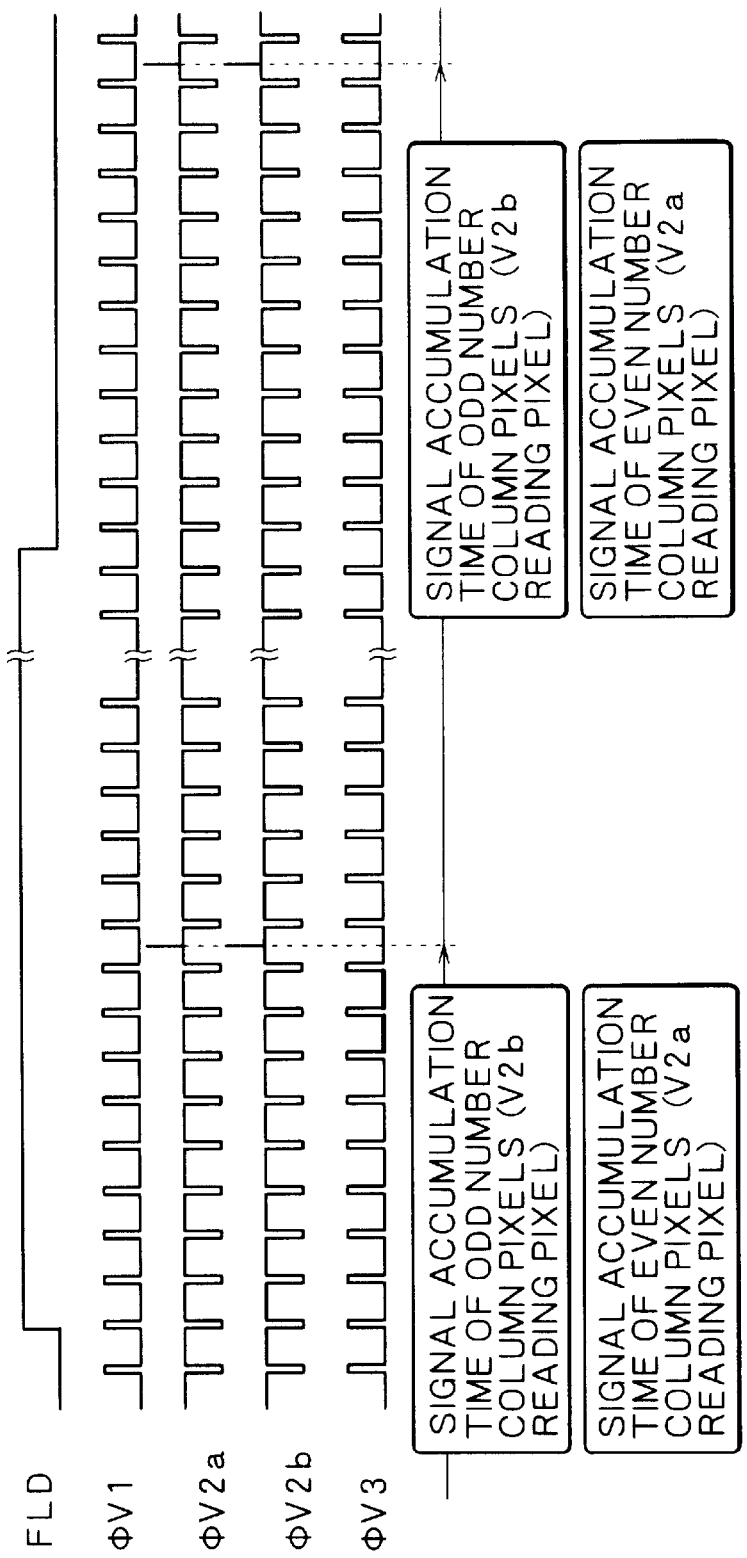

SOLID-STATE IMAGE SENSING APPARATUS, METHOD FOR DRIVING THE SAME AND CAMERA

BACKGROUND OF THE INVENTION

1. Field of the Invention

The present invention relates to a solid-state image sensing apparatus, method for driving the same apparatus and camera and more particularly to a so-called wide dynamic range CCD (Charge Coupled Device) solid-state image sensing apparatus assuring a signal output of wide dynamic range for an optical input, a method for driving the same apparatus and a camera using, as an image sensing device, a CCD solid-state image sensing apparatus of wide dynamic range.

2. Description of the Related Art

In a CCD solid-state image sensing apparatus, each pixel (photoelectric conversion element) conducts photoelectric conversion, a signal output becomes constant after the accumulated signal charge overflows from the pixel and therefore the signal output for the amount of further incident light can no longer be obtained. Therefore, dynamic range for incident light is rather narrow and when a person standing at the side of window, for example, is picked up by a camera from the inside of room, such person is picked up as a black image.

In view of widening the dynamic range, following method has been introduced in the related art, in which after the signal charge based on the ordinary exposing time in the effective period in the vertical direction is read, a short exposing period is set again within the vertical blanking period, the signal charge based on this short exposing time is read again, the signal charge of longer exposing time and the signal charge of shorter exposing time are respectively converted to electric signals in the charge detecting section and these signal charges are generally guided as the exposed signal and blanking exposed signal and are then added in a line memory of the external signal processing system.

However, this method of related art has a problem that since an ordinary exposed signal or blanking exposed signal of 1H (H: horizontal scanning period) is required to be once stored in the line memory to add both exposed signals, a line memory and a control circuit are required for the external signal processing system of the solid-state image sensing apparatus and thereby the circuit structure of the relevant signal processing system is complicated.

Meanwhile, there is provided a CCD solid-state image sensing apparatus (refer to Japanese Published Unexamined Patent Application No. HEI 4-298175) for which a group of pixels is formed by a plurality of neighboring pixels arranged in two dimensions, the pixels in each group are given different photoelectric sensing characteristics, signal charges of the pixels in different photoelectric sensing characteristics are individually read and are then transferred to the charge detecting section by the vertical and horizontal transfer sections, the signal charges in higher photoelectric sensing characteristics are clipped by the predetermined clip level in the relevant charge detecting section and the signal charges in the lower photoelectric sensing characteristics are added to the clipped signal charges in the higher photoelectric sensing characteristics.

As explained above, in the CCD solid-state image sensing apparatus of the related art in which the clipping and addition are conducted within the device, it is not required to provide the line memory and the control circuit in the external signal processing system. Therefore this apparatus has a merit that the circuit structure of the relevant signal processing system can be simplified but also has the following new problem because of the clipping and addition of the signal charges.

Namely, in the charge detecting section consisting of an FD (floating diffusion) area for converting, as an output, the signal charge to a signal voltage, an RD (reset drain) area for exhausting signal charge in the FD area and a reset gate section having single reset gate electrode provided between the FD area and RD area, the predetermined clip level is set first to the low level of the reset pulse to be applied to the reset gate electrode, the signal charge of higher photoelectric sensing characteristic is clipped by this clip level, the lower level of the reset pulse is set to the further low predetermined level, the signal charge of lower photoelectric sensing characteristic is added to the clipped signal charge of the higher photoelectric sensing characteristic, thereafter the low level of the reset pulse is set to the reset level for the reset operation. Accordingly, the low level of the reset pulse must be switched in the three stages.

As explained above, for the clipping and addition in the charge detecting section, the pulse taking the three levels must be used as the reset pulse and the circuit structure of a pulse generating circuit to generate such reset pulse is complicated and the timing control becomes very difficult. Particularly, since the reset period of the reset gate section is as high as ½ the drive frequency of the horizontal transfer section, the higher rate is also required for the timing control of the reset pulse taking the three levels. However, here rises a problem that it is very difficult to realize such high speed timing control for the reset pulse.

SUMMARY OF THE INVENTION

The present invention has been proposed considering the problems of the related art explained above and it is therefore an object of the present invention to provide a solid-stage image sensing apparatus, the method for driving the same apparatus and the camera which can realize the clipping and addition of the signal charges within the device through the simplified timing control.

The solid-state image sensing apparatus of the present invention has a structure of comprising the charge detecting section consisting of an output diffusion area for detecting, as an output, the signal charge transferred from the image sensing section to an electric signal, a reset drain area for exhausting signal charge in the output diffusion area and a reset gate section having a plurality of reset gate electrodes arranged in vertical between the output diffusion area and reset drain area.

In the charge detecting section of the structure explained above, since the reset gate section has a plurality of reset gate electrodes, a plurality of reset pulses can be applied to a plurality of reset gate electrodes. By setting the low level of these reset pulses to an adequate value, a certain reset electrode performs the clip operation and reset operation for the signal charge transferred to the output diffusion area, while the other reset gate electrodes execute addition and reset operation.

Moreover, the method for driving the solid-state image sensing apparatus of the present invention comprises the steps, in the solid-state image sensing apparatus including an image sensing section for sequentially obtaining a plurality of kinds of signal charges in different photoelectric sensing characteristic and a charge detecting section of the structure explained above, that a first reset pulse is applied at least to the reset gate electrodes other than the reset gate electrode nearest to the reset drain area among a plurality of reset gate electrodes, the signal charges of higher photoelectric sensing characteristics (hereinafter, referred to as high sensitivity signal charges) in the output diffusion area are clipped by the clip level determined by the low level of the first reset pulse, the second reset pulse of the level lower than the first reset pulse is applied, after the clipping, to the reset gate electrode in the reset drain area side, the signal charges of lower photoelectric sensing characteristics (hereinafter referred to as low sensitivity signal charges) are added to the clipped high sensitivity signal charges, and thereafter high level of the first and second reset pulses is set as the reset level.

In the solid-state image sensing apparatus of the structure explained above, the first reset pulse of which low level is higher than the reset level is previously impressed first at least to the reset gate electrode other than the reset gate electrode nearest to the reset drain area among a plurality of reset gate electrodes. Under this condition, when the high sensitivity signal charge is transferred to the output diffusion area, this high sensitivity signal charge is clipped by the clip level determined by the low level of the first reset pulse. With this clipping operation, even if the incident light is applied to the pixel in such amount as saturating the pixel having the high photoelectric sensing characteristic, fluctuation of the overflow characteristic of each pixel can be eliminated.

Upon completion of this clipping operation, the second reset pulse of which low level is lower than the first reset pulse is impressed to the reset gate electrode in the reset drain area side. In this case, the clipped high sensitivity signal charge is being accumulated in the output diffusion area. Under this condition, when the low sensitivity signal charge is transferred to the output diffusion area, the clipped high sensitivity signal charge and low sensitivity signal charge are added within the output diffusion area. With this adding operation, the pixel signal can be obtained and thereby the dynamic range can also be widen. The reset operation can also be conducted by setting the high level of the first and second reset pulses to the reset level.

The camera of the present invention uses the solid-state image sensing apparatus of the structure explained above as the image sensing device. In this case, image sensing of the wider dynamic range can be realized. For example, even when a person standing by the side of window is picked up from the side of room, a person will never be picked up as a black image and good image can be picked up. Particularly when the structure allows selection of the addition mode for adding the signal charges in the output diffusion area of the charge detecting section and the no-addition mode, image can be picked up in the ordinary mode in addition to the image pickup in the mode for expanding the dynamic range.

BRIEF DESCRIPTION OF THE DRAWINGS

FIG. 12 is a timing chart of the vertical transfer pulse in the ordinary operation mode.

DESCRIPTION OF THE PREFERRED EMBODIMENTS

Figure 1:
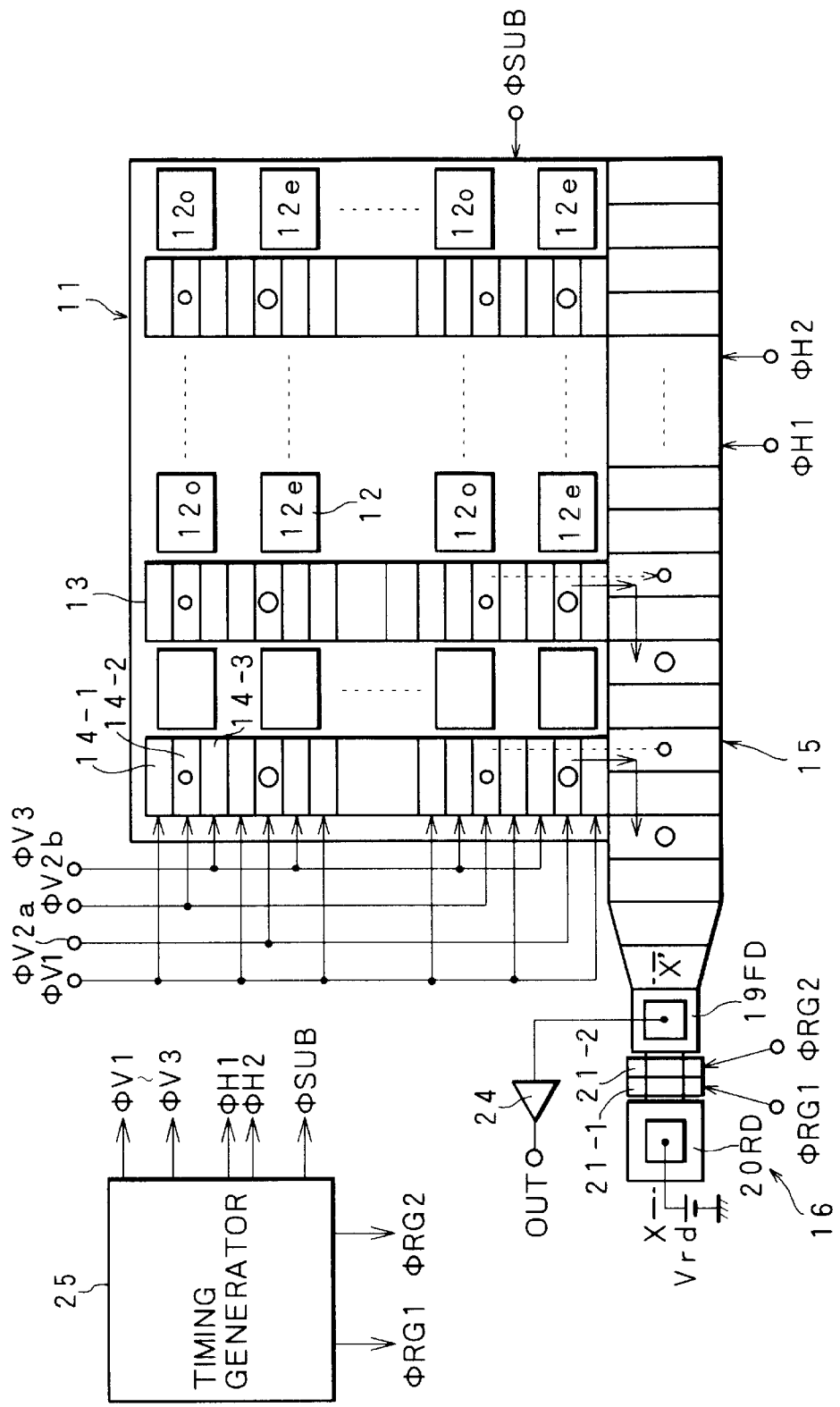
FIG. 1 is a schematic structural diagram showing an embodiment of a CCD solid-state image sensing apparatus of the present invention.

The preferred embodiments of the present invention will be explained in detail with reference to the accompanying drawings. FIG. 1 is a schematic diagram showing an embodiment of the CCD solid-state image sensing apparatus of the present invention.

In FIG. 1, the image sensing section (image sensing area) 11 is composed of a plurality of photoelectric conversing elements (pixels) 12 which are arranged in two dimensions in the form of matrix on a semiconductor substrate to convert, for accumulation, the incident light to signal charge in the amount of charges depending on the quantity of light and a plurality of vertical transfer sections 13 provided along the arrangement direction for every vertical arrangement of a plurality of photoelectric converting elements 12. In this image sensing section 11, a plurality of photoelectric converting elements 12 are classified into the pixel group 12o of odd number lines and the pixel group 12e of even number lines and the high sensitivity signal charge and low sensitivity signal charge are respectively obtained alternately, as will be explained later, in unit of the field from the pixel group 12o of the odd number lines and pixel group 12e of the even number lines.

A plurality of vertical transfer sections 13 are composed of aggregation of packets (packet lines) provided in the correspondence relationship of 1:1 to each pixel and the three transfer electrodes 14-1, 14-2, 13-3 are arranged in the transfer direction on the transfer channel of each packet. The center transfer electrode 14-2, for example, among these transfer electrodes 14-1, 14-2, 14-3 also works as the reading gate electrode for reading the signal charge from the photoelectric converting element 12. The vertical transfer section 13 is driven for transfer by the 4-phase vertical transfer pulses φV1, φV2a, φV2b, φV3.

The vertical transfer pulses φV1, φV3 among this 4-phase vertical transfer pulses φV1, φV2a, φV2b, φV3 are respectively applied to the transfer electrodes 14-1, 14-3 of each packet and the vertical transfer pulse φV2a is impressed to the transfer electrode 14-2 of the packet corresponding to the pixel group 12e of even number lines and the vertical transfer pulse φV2b to the transfer electrode 14-2 of the packet corresponding to the pixel group 12o of odd number lines, respectively. Here, since the transfer electrode 14-2 also works as the reading gate electrode, the vertical transfer pulses φV2a, φV2b take the three levels of low level, intermediate level and high level and the pulse of high level becomes the read pulse. Difference between the vertical transfer pulses φV2a, φV2b lies in the read pulse generation timing.

At the lower side of the drawing of the image sensing section 11, the horizontal transfer section 15 is arranged at the area neighboring the end section of the transfer direction of a plurality of vertical transfer sections 13. This horizontal transfer section 15 is driven for the transfer by the horizontal transfer pulses φH1, φH2 having the phases inverted with each other. At the end portion of the transfer direction of the horizontal transfer section 15, the charge detecting section 16 of the floating diffusion amplifier structure, for example, is provided to detect the signal charge transferred by the horizontal transfer section 15 and convert such signal charge to a signal voltage as an output.

Figure 2:
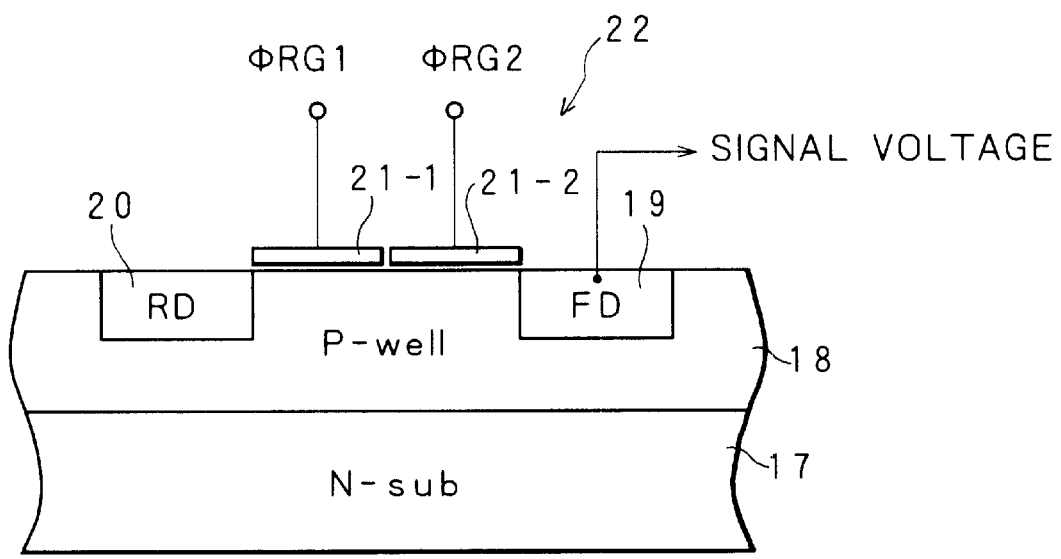
FIG. 2 is a cross-sectional structural diagram of the charge detecting section showing the cross-section along the line X–X' in FIG. 1.

The present invention is characterized in the structure of the charge detecting section 16. The practical example of the structure of this charge detecting section 16 will be explained. FIG. 2 shows a structure of the cross-section of FIG. 1 along the line X–X'.

The charge detecting section 16 is composed of the FD (floating diffusion) area 19 and the RD (reset drain) area 20 consisting of N-type impurity formed keeping the predetermined distance therebetween on the surface of the P well 18 on the N-type semiconductor substrate 17 and the reset gate section 22 having, for example, two reset gate electrodes 21-1, 21-2 arranged in vertical at the upper part of the channel area between these areas 19, 20 in order to realize the clip operation for the signal charges in the FD area 19.

Figure 3:
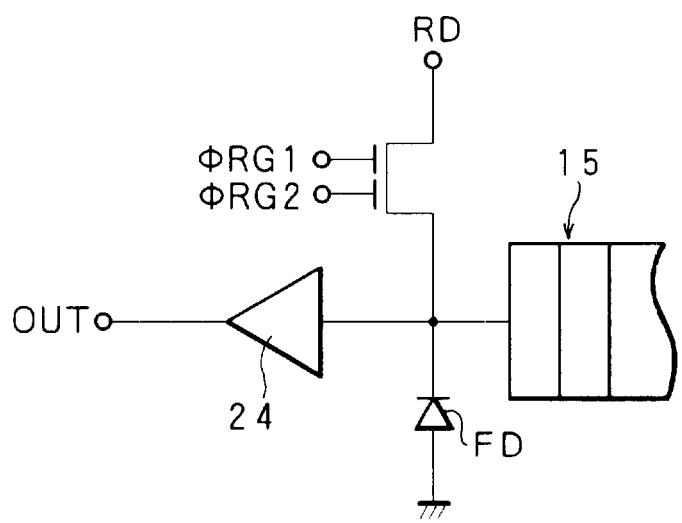
FIG. 3 shows an equivalent circuit of the charge detecting section.

In the charge detecting section 16 of such structure, the predetermined reset drain voltage Vrd is impressed to the RD area 20. Moreover, the reset pulses, φRG1, φRG2 are respectively applied to the two reset gate electrodes 21-1, 21-2. The signal charge transferred to the FD area 19 from the horizontal transfer section 15 is clipped and added in he FD area 19 and thereafter it is converted to the signal voltage and is then output to the external circuit via the buffer 24. FIG. 3 shows an equivalent circuit of the charge detecting section 16.

Figure 5:
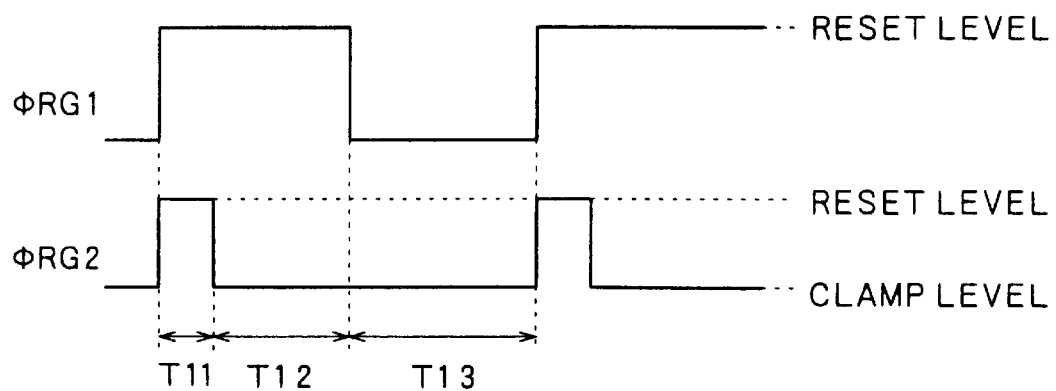
FIG. 5 shows waveforms of reset pulses in the wide dynamic range mode.

Waveform examples of the reset pulses φRG1, φRG2 are shown in FIG. 5. The reset pulse φRG2 is set in such a manner that the high level thereof is set to the level for the reset operation (hereinafter, referred to as reset level) and the low level is set to the level for the clip operation (hereinafter, referred to as clip level). The reset pulse φRG1 is set in such a manner that the high level thereof is set to the reset level and the low level is set to the predetermined level lower than the clip level of the reset pulse φRG2.

A CCD solid-state image sensing apparatus of wide dynamic range has been structured as explained above. The 4-phase vertical transfer pulses φV1, φV2a, φV2b, φV3 for driving the vertical transfer section 13, 2-phase horizontal transfer pulses φH1, φH2 for driving the horizontal transfer section 15, two reset pulses φRG1, φRG2 for driving the charge detecting section 16 and moreover a shutter pulse φSUB to be applied to the substrate are generated by a timing generator 25. Since the shutter pulse SUB is impressed to the substrate, the electronic shutter operation to exhaust all signal charges accumulated in the photoelectric converting element 12 to the substrate can be realized.

Next, the driving method to expand the dynamic range in the CCD solid-state image sensing apparatus of the structure explained above will be explained.

In the image sensing section 11, as an example, two kinds of signal charges (high sensitivity/low sensitivity) in different photoelectric sensing characteristics can be obtained by changing the exposing time (accumulation time). In this example, a high sensitivity signal charge and a low sensitivity signal charge can be obtained by setting the ordinary exposing period to the vertical effective image sensing period and then setting the short exposing period to the vertical blanking period. In FIG. 1, for helping understanding, the high sensitivity signal charge is indicated with a large circle ○, while the low sensitivity signal charge with a small circle ○.

In the structure of this example, the high sensitivity signal charge and low sensitivity signal charge can be obtained by giving difference to the photoelectric sensing characteristic between the adjacent two pixels in the vertical direction, but it is also possible to give difference to the photoelectric sensing characteristic between two pixels in the horizontal direction. Moreover, it is also possible not only to set in two stages of high and low photoelectric sensing characteristics but also to set the photoelectric sensing characteristics in three or more stages in the adjacent three or more pixels. In addition, as a method for obtaining signal charges in different photoelectric sensing characteristics, it is possible, in addition to the method for giving difference to the exposing time, to give difference to the aperture area at the opening area of pixel and to give difference to transmittance of pixel using an optical filter.

Figure 4:
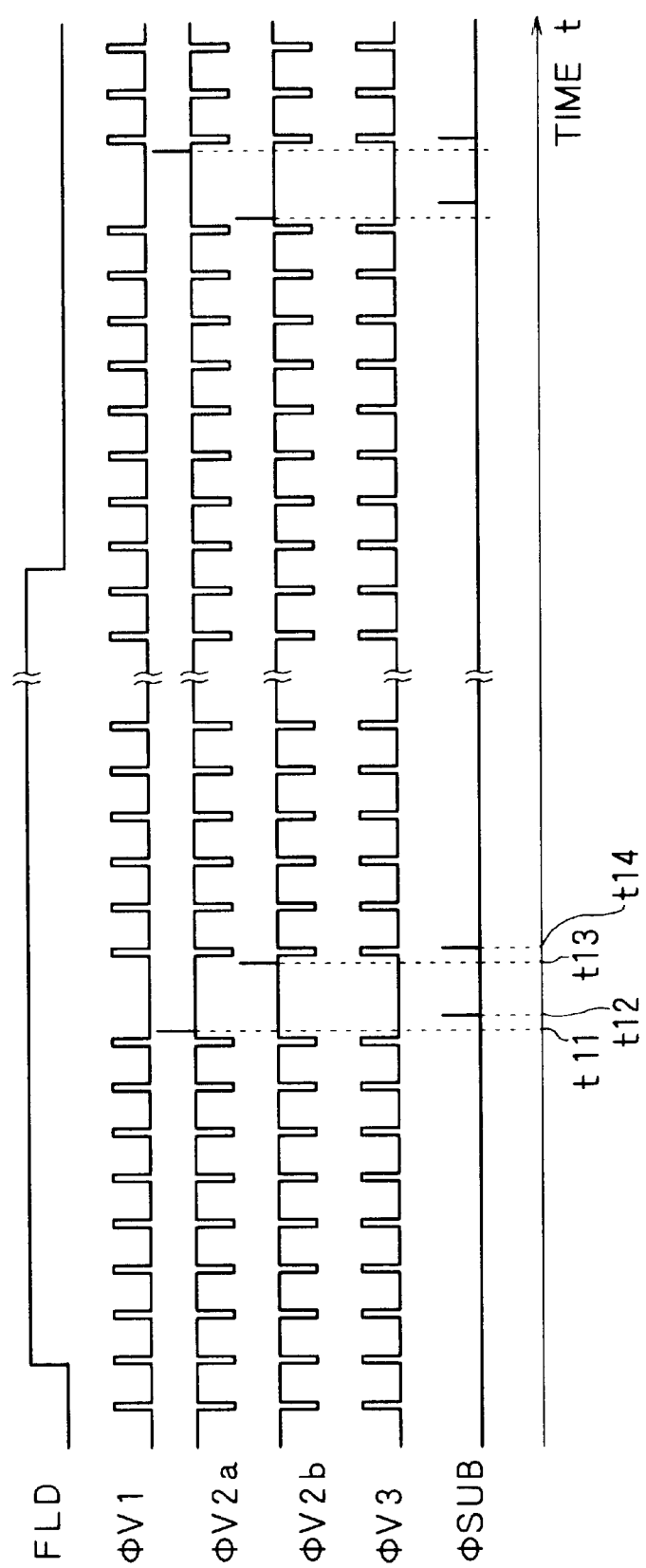
FIG. 4 is a timing chart of the vertical transfer pulse in the wide dynamic range mode.

First, operation of the image sensing section 11 will be explained using the timing chart of FIG. 4. When the read pulse is added to the vertical transfer pulse φV2a at the time t11 in the even number fields, the high sensitivity signal charges of the pixel group 12e of the even number lines photoelectrically converted in the vertical effective image period is read by the vertical transfer section 13. After the high sensitivity signal charge is read, the shutter pulse φSUB is applied to the substrate at the time t12. Thereby, the signal charges in all pixels are exhausted to the substrate.

Thereafter, the photoelectric conversion is executed again in the vertical blanking period and when the read pulse is added to the vertical transfer pulse V2b at the time t13 during this vertical blanking period, the low sensitivity signal charge of the pixel group 12o of odd number lines photoelectrically converted within the short exposing time during the vertical blanking period is read to the vertical transfer section 13. After the low sensitivity signal charge Is read, the shutter pulse φSUB is impressed again to the substrate at the time t14. Thereby, the signal charges of all pixels are exhausted to the substrate. Subsequently, the photoelectric converting operation of the odd number fields can be started.

With the operations explained above, the high sensitivity signal charge and low sensitivity signal charge are alternately arranged in the vertical transfer section 13. A pair of the high sensitivity signal charge and low sensitivity signal charge is transferred to the horizontal transfer section 15 by the vertical transfer operation of the vertical transfer section 13. Thereby, the high sensitivity signal charge and low sensitivity signal charge are alternately arranged in the horizontal transfer section 15. Subsequently, the high sensitivity signal charge and low sensitivity signal charge are alternately transferred to the FD area 19 of the charge detecting section 16 by the horizontal transfer operation of the horizontal transfer section 15. Operations of this charge detecting section 16 will be explained later in detail.

When the read pulse is added to the vertical transfer pulse φV2b at the time t15 in the odd number fields, the high sensitivity signal charge of the pixel group 12o of the odd number lines photoelectrically converted in the vertical effective image period is read to the vertical transfer section 13. After the high sensitivity signal charge is read, the shutter pulse SUB is impressed to the substrate at the time t16. Thereby, the signal charges in all pixels are exhausted to the substrate.

Thereafter, when the photoelectric conversion is executed again in the vertical blanking period and the read pulse is added to the vertical transfer pulse φV2a at the time t17 during the vertical blanking period, the low sensitivity signal charge of the pixel group 12e of the even number lines photoelectrically converted in the short exposing period during the vertical blanking period is read to the vertical transfer section 13. After the low sensitivity signal charge is read, the shutter pulse φSUB is impressed again to the substrate at the time t18. Thereby, the signal charges of all pixels are exhausted to the substrate. A series of operation explained above are repeated in unit of field.

In this embodiment, the high sensitivity signal charge and low sensitivity signal charge can be obtained by giving difference to the photoelectric sensing characteristics among a plurality of pixels (photoelectric conversion elements). However, in the case of the method in which difference is given to the photoelectric sensing characteristics by varying the exposing time, the high sensitivity signal charge and low sensitivity signal charge can be obtained from the same pixel.

Figure 6:
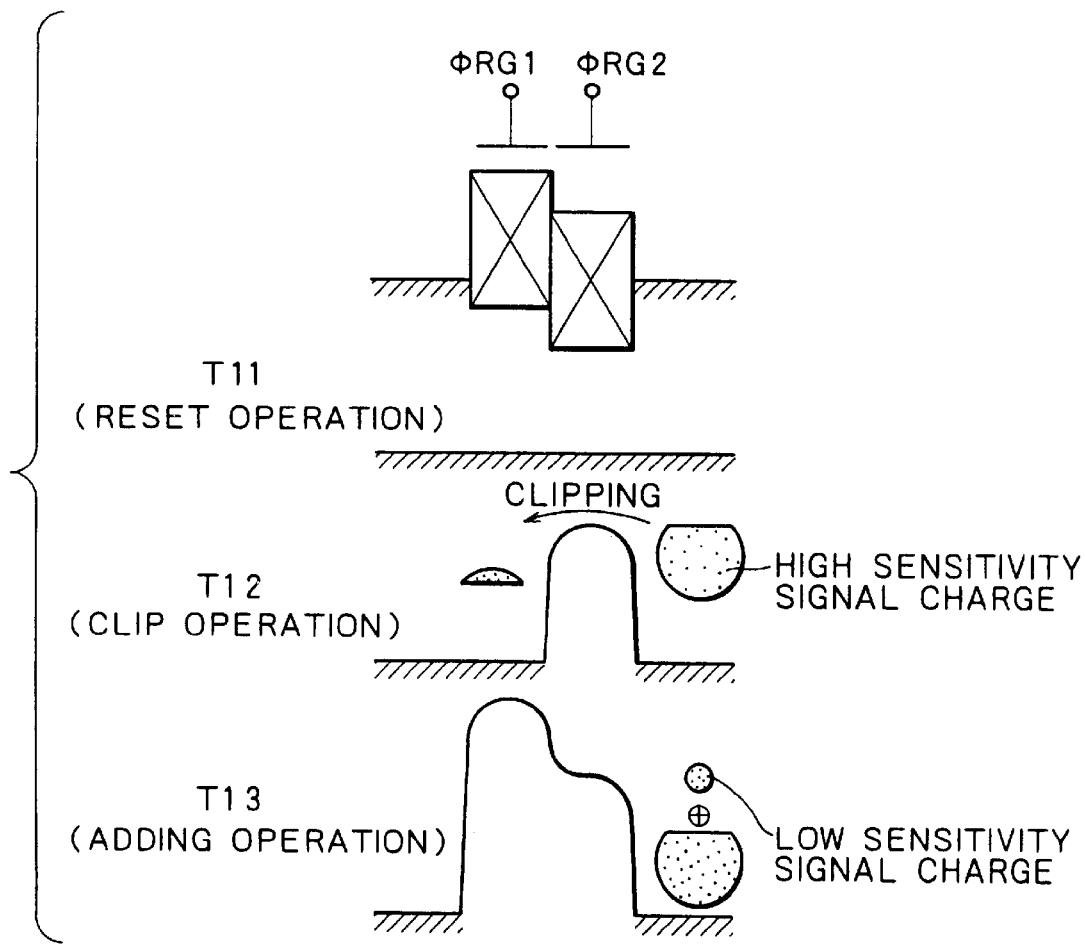
FIG. 6 is a potential diagram for explaining the reset operation, clipping operation and adding operation in the charge detecting section.

Next, operation of the charge detecting section 16 will be explained using the waveform diagram of FIG. 5 and potential diagram of FIG. 6.

First, the reset operation period is defined by the period T11 where both the reset pulses φRG1, φRG2 become high level. In this reset operation period T11, since the potentials under the reset gate electrodes 21-1, 21-2 become deep, the charges in the FD area 19 are exhausted to the RD area 20 as the reset operation.

Subsequently, when the reset pulse φRG2 shows transitional changes to low level from high level, the potential under the reset gate electrode 21-2 becomes shallow. Accumulation capacity of the FD area 19 is determined depending on height of the potential barrier under the reset gate electrode 21-2. Since the saturation signal amount of each pixel of the image sensing section 11 is fluctuated (saturation fluctuation), the accumulation capacity of the FD area 19 is set to the low level value of the reset pulse φRG2 so that the minimum saturation signal amount in such fluctuation can be obtained.

The clipping operation period is defined by the period T12 in which the reset pulse φRG1 becomes high level and the reset pulse becomes low level. In this clipping period, when the high sensitivity signal charge obtained for the incident light amount which saturates the pixels of higher photoelectric sensing characteristic is transferred to the FD area 19 from the horizontal transfer section 15, the signal charge amount exceeds the potential barrier under the reset gate electrode 21-2 and the overflowing charges are exhausted to the RD area 20 for the clipping operation.

Subsequently, when the reset pulse φRG1 is transitionally changed to low level from high level, since the low level value is set lower than the low level of the reset pulse φRG2, the potential under the reset gate electrode 21-2 becomes shallower than the potential under the reset gate electrode 21-2.

The adding operation period is defined by the period T13 in which the reset pulses φRG1, φRG2 are in the low level. In this adding operation period, since the low sensitivity signal charge is transferred to the FD area 19, the clipped high sensitivity signal charge and low sensitivity signal charge are added. Thereafter, the reset operation period T11 starts again. Subsequently, a series of operations of the reset operation, clipping operation and adding operation are repeated.

Figure 7:
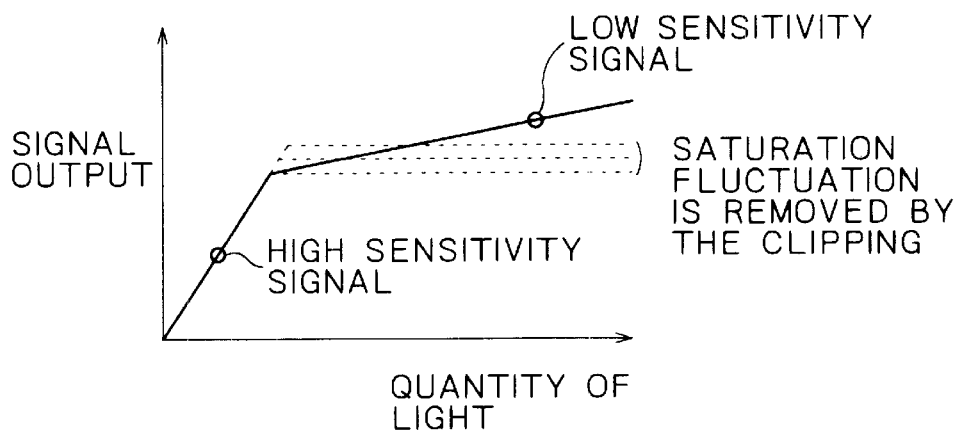
FIG. 7 is an output characteristic diagram of the quantity of light and signal output of the present invention.

As explained above, the signal output including no saturation fluctuation of the pixels can be obtained, as shown in FIG. 7, by forming a pair with the high sensitivity signal charge and low sensitivity signal charge obtained from the adjacent pixels (or the same pixel) and then clipping first the charges corresponding to the saturation fluctuation of the pixels for the high sensitivity signal charge in the charge detecting section 16 and then curtailing once the reset operation to add the low sensitivity signal charge to the clipped high sensitivity signal charge. Thereby, the light amount range which is output from the solid-state image sensing apparatus can be widen, dynamic range of the output signal can be widen and the reset noise can be reduced to a half by once curtailing the reset operation.

Particularly, since a plurality of reset gate electrodes 21-1, 21-2 are arranged in vertical between the FD area 19 and RD area 20 and different reset pulses φRG1, φRG2 are applied to these reset gate electrodes 21-1, 21-2 in the charge detecting section 16, the reset gate electrodes 21-1, 21-2 are capable of executing the pulse operations of the two levels and does not require the pulse operation of three or more levels. Therefore, the circuit structure of the timing generator 25 to generate the reset pulses φRG1 and φRG2 can be simplified and moreover high speed operation can also be executed because the timing control can be realized easily.

Figure 8:
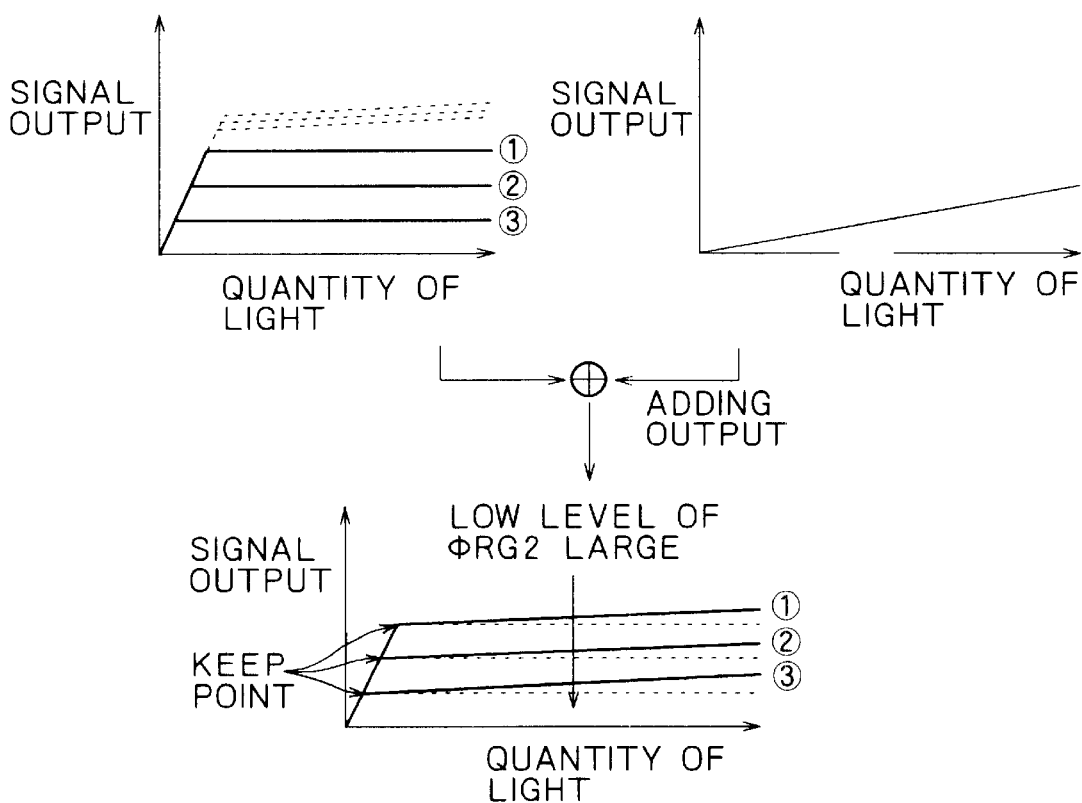
FIG. 8 is an output characteristic diagram of the quantity of light and signal output of a modification example of the present invention.

Moreover, the knee point of output characteristic can freely be set as shown in FIG. 8 by varying the low level value of the reset pulse φRG2 which determines height of potential barrier under the reset gate electrode 21-2. Moreover, it is also possible to obtain the output characteristic which is near to the logarithmic characteristic having a plurality of knee points by arranging in vertical three or more reset gate electrodes and freely setting the low level value of a plurality of reset pulses φRG2 to be applied to the reset gate electrode other than the reset gate electrode nearest to the RD area 20.

Figure 9:
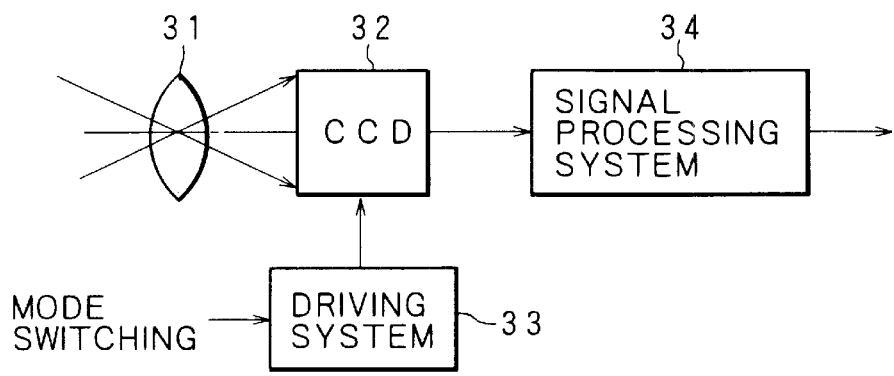
FIG. 9 is a schematic structural diagram showing an example of the structure of camera in relation to the present invention.

FIG. 9 is a schematic structural diagram of an example of the structure of camera of the present invention to which a CCD solid-state image sensing apparatus of the wide dynamic range and the method for driving the same are applied. In FIG. 9, the incident light from an object is focused on the image sensing surface of a CCD solid-state image sensing apparatus 32 of wide dynamic range with an optical system including a lens 31. As the CCD solid-state image sensing apparatus 32, the structure shown in FIG. 1 is used. This CCD solid-state image sensing apparatus 32 is driven based on the driving method explained above by the driving system 323 including the timing generator 25 of FIG. 1. An output signal of the CCD solid-state image sensing apparatus 32 becomes an image signal through various signal processes in the signal processing system 34.

In the camera of the structure explained above, a signal having the appropriately controlled dynamic range is output in direct from the CCD solid-state image sensing apparatus 32. A camera assuring the contract from low luminance and high luminance and having matching property with the system of the related art can be obtained by inputting such output signal to the signal processing system 34 of the same structure as the related art.

By introduction of the structure to give the operation mode switching function, in addition to the function as wide dynamic range mode, to change the timing of the drive pulse given to the CCD solid-state image sensing apparatus 32 from the driving system 33 depending on the switching of the operation mode, the ordinary image sensing mode and wide dynamic range mode can be selectively switched.

Figure 10:
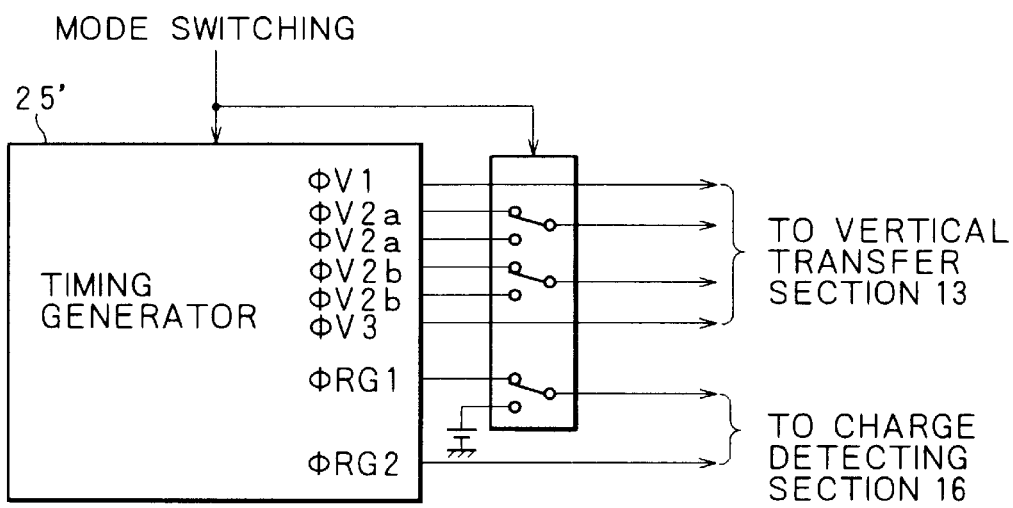
FIG. 10 is a block diagram showing a modification example of the driving system.

In the case of this mode switching, the driving method explained above can be introduced for the wide dynamic range mode but it is not required to use the low sensitivity signal charge in the ordinary image sensing mode. Therefore, it is required that the vertical transfer pulses φV2$a$, φV2$b$ to be impressed to the vertical transfer section 13 are switched for the ordinary image sensing mode and wide dynamic range mode from the viewpoint of the timing. For this purpose, as shown in FIG. 10, it is enough that the timing generator 25' generates the vertical transfer pulses for wide dynamic range mode and the vertical transfer pulses φV2$a$', φV2$b$' for ordinary image sensing mode and such pulses are selected depending on each operation mode.

Figure 11:
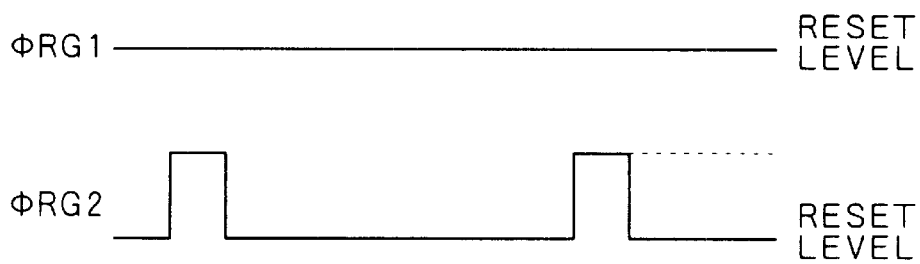
FIG. 11 shows waveforms of reset pulses in the ordinary operation mode.

Moreover, in the charge detecting section 16, it is enough when at least one of the two reset gate electrodes 21-1, 21-2 executes the reset operation. Therefore, as shown in the waveform diagram of FIG. 11, for example, the reset pulse φRG1 is fixed to the DC level for the reset and the reset pulse φRG2 is set to the same pulse as that in the wide dynamic range mode.

Thereby, since the signal charges of adjacent two pixels in the vertical direction are paired and are then transferred as in the case of the wide dynamic range mode on the occasion of transferring the signal charge to the horizontal transfer section 15 from the vertical transfer section 13 and the signal charges of two pixels are added in the FD area 19 by changing the combination of two pixels in unit of field, the interlaced signal appears. FIG. 12 shows the timing chart of the vertical transfer pulses, φV1, φV2$a$', φV2$b$', φV3 in the ordinary image sensing mode.

As explained above, there is provided a camera which can always provide good sensed image without depending on the image sensing environment by enabling the switching of the operation mode between the wide dynamic range mode and ordinary image sensing mode for the camera used as the CCD solid-state image sensing apparatus of the structure shown in FIG. 1 as the image sensing device and by selecting the operation mode depending on the image sensing environment.

As explained previously, according to the present invention, since a plurality of reset gate electrodes are provided in the charge detecting section in the solid-state image sensing apparatus, a plurality of reset pulses can be applied to a plurality of reset gate electrodes and the reset gate electrode can be driven with the two-level pulse. Therefore, even when the high speed characteristic is required, the dynamic range of the signal output for the incident light can be widen.

Moreover, in the camera of the present invention, since such solid-state image sensing apparatus is used as the image sensing device and thereby image sensing in the wide dynamic range becomes possible, if a person standing by the window is sensed from the inside of room, the person is never sensed as a black image and good image quality can be assured.

What is claimed is:

1. Solid-state image sensing apparatus comprising:
   a charge detecting section comprising:
   an output diffusion area for converting, as an output, signal charges transferred from an image sensing section into an electrical signal;
   a reset drain area for exhausting signal charges in said output diffusion area; and
   a reset gate section having a plurality of reset gate electrodes arranged in vertical between said output diffusion area and said reset drain area,
   wherein signal charges of plural kinds in different photoelectric sensing characteristics are sequentially transferred to said output diffusion area from said image sensing section; and
   wherein the signal charges having a higher photoelectric sensing characteristic in said output diffusion area are clipped, in said reset gate section, with a clip level determined by a lower level of a first reset pulse impressed at least to reset gate electrodes other than a reset gate electrode nearest to said reset drain area among said plurality of reset gate electrodes and a second reset pulse of a lower level that is lower than the lower level of said first reset pulse is impressed, after the clipping, to the reset gate nearest to said reset drain area.

2. Solid-state image sensing apparatus according to claim 1, wherein a low level value of said first reset pulse is variable.

3. Method for driving a solid-state image sensing apparatus comprising an image sensing section for sequentially obtaining plural kinds of signal charges in different photoelectric sensing characteristics and a charge detecting section consisting of an output diffusion area for converting, as an output, the signal charges transferred from said image sensing section to an electric signal, a reset drain area for exhausting signal charges in said output diffusion area, and a reset gate section having a plurality of reset gate electrodes arranged in vertical between said output diffusion area and said reset drain area, wherein:
   a first reset pulse is impressed at least to the reset gate electrodes other than a reset gate electrode nearest to said reset drain area among said plurality of reset gate electrodes and a signal charge having a higher photoelectric sensing characteristic in said output diffusion area is clipped by a clip level determined by a low level of the first reset pulse;
   a second reset pulse in a lower level that is lower than the lower level of said first reset pulse is impressed, after the clipping, to the reset gate electrode nearest to said reset drain area and a signal charge of lower photoelectric sensing characteristic is added to the signal charge of higher photoelectric sensing characteristic after the clipping; and
   a higher level of each of the first and second reset pulses are then set to the reset level.

4. Camera comprising:
   an image sensing device including a solid-state image sensing apparatus comprising a charge detecting section consisting of an output diffusion area for converting, as an output, signal charges transferred from an image sensing section into an electrical signal, a reset drain area for exhausting signal charge in said output diffusion area, and a reset gate section having a plurality of reset gate electrodes arranged in vertical between said output diffusion area and said reset drain area,
   wherein signal charges of plural kinds in different photoelectric sensing characteristics are sequentially transferred to said output diffusion area from said image sensing section; and wherein the signal charges having a higher photoelectric sensing characteristic in said output diffusion area are clipped, in said reset gate section, with a clip level determined by a lower level of a first reset pulse impressed at least to reset gate electrodes other than a reset gate electrode nearest to said reset drain area among said plurality of reset gate electrodes and a second reset pulse of a lower level that is lower than the lower level of said first reset pulse is impressed, after the clipping, to the reset gate nearest to said reset drain area.

5. Camera according to claim 4, wherein an addition mode in which signal charges are added in said output diffusion area and a no-addition mode in which signal charges are not added is selectable.

6. Camera according to claim 5, wherein the low level of said first reset pulse is variable.

7. Camera according to claim 5, wherein the signal charges of the same photoelectric sensing characteristic is transferred, in said no-addition mode, to said output diffusion area from said image sensing section and the reset operation is performed, in said charge detecting section, with the period of supplying the signal charge to said output diffusion area.

* * * * *